United States Patent
Lee et al.

(10) Patent No.: US 9,190,044 B2
(45) Date of Patent: Nov. 17, 2015

(54) STRUCTURE OF SOUNDPROOF COVER FOR ENGINE ROOM

(71) Applicants: Hyundai Motor Company, Seoul (KR); NVH Korea, INC., Ulsan-shi (KR)

(72) Inventors: Sang-Ill Lee, Seoul (KR); Jee-Young Youn, Inchun-shi (KR); Sang-Ik Lee, Hwasung-shi (KR)

(73) Assignees: HYUNDAI MOTOR COMPANY, Seoul (KR); NVH KOREA, INC., Ulsan-Shi (KR)

( * ) Notice: Subject to any disclaimer, the term of this patent is extended or adjusted under 35 U.S.C. 154(b) by 0 days.

(21) Appl. No.: 14/247,952

(22) Filed: Apr. 8, 2014

(65) Prior Publication Data

US 2014/0299403 A1     Oct. 9, 2014

(30) Foreign Application Priority Data

Apr. 8, 2013   (KR) .................. 10-2013-0038224
Feb. 24, 2014   (KR) .................. 10-2014-0021325

(51) Int. Cl.
*G10K 11/16*     (2006.01)
*B60R 13/08*     (2006.01)

(52) U.S. Cl.
CPC ............ *G10K 11/16* (2013.01); *B60R 13/0838* (2013.01)

(58) Field of Classification Search
CPC .. B60R 13/08; B60R 13/083; B60R 13/0838; B32B 7/04; B32B 7/045; B32B 7/06; B32B 7/08; B32B 7/12; B32B 7/14
USPC .................. 181/200, 204, 205, 290; 296/39.3
See application file for complete search history.

(56) References Cited

U.S. PATENT DOCUMENTS

| | | | |
|---|---|---|---|
| 6,695,374 B1 * | 2/2004 | Gebreselassie et al. ...... | 296/24.3 |
| 2002/0160682 A1 * | 10/2002 | Zeng et al. .................... | 442/411 |
| 2006/0179827 A1 * | 8/2006 | Hofmann et al. ............... | 60/299 |
| 2006/0179828 A1 * | 8/2006 | Ell .................................. | 60/299 |
| 2008/0110432 A1 * | 5/2008 | Nonogaki ................. | 123/195 C |
| 2010/0032234 A1 * | 2/2010 | Niwa et al. .................... | 181/290 |
| 2013/0057013 A1 * | 3/2013 | Schaefer et al. ............. | 296/39.3 |
| 2013/0153330 A1 * | 6/2013 | Fushiki ......................... | 181/290 |

FOREIGN PATENT DOCUMENTS

| | | |
|---|---|---|
| JP | 10-324267 A | 12/1998 |
| JP | 11-321708 A | 11/1999 |
| JP | 2000-71902 A | 3/2000 |
| JP | 2011-057092 A | 3/2011 |
| KR | 10-1986-0003942 A | 6/1986 |

* cited by examiner

*Primary Examiner* — Jeremy Luks
(74) *Attorney, Agent, or Firm* — Morgan, Lewis & Bockius LLP

(57) ABSTRACT

A structure of a soundproof cover for an engine room is mounted on a body frame at a rear side of the engine room in which an engine is mounted. The structure may include two or more piece members that are detachably coupled to each other and collectively form the soundproof cover in a panel shape. The soundproof cover is to be mounted on the body frame so that one side surface of the soundproof cover is directed toward the engine and the other side surface of the soundproof cover is directed toward an interior of a vehicle.

9 Claims, 7 Drawing Sheets

STRUCTURE OF SOUNDPROOF COVER FOR ENGINE ROOM

CROSS-REFERENCE TO RELATED APPLICATIONS

The present application claims priority of Korean Patent Application Numbers 10-2013-38224 filed on Apr. 8, 2013 and 10-2014-21325 filed on Feb. 24, 2014, the entire contents of which applications are incorporated herein for all purposes by this reference, and these patent applications are supported by WC-300 project.

BACKGROUND OF INVENTION

1. Field of Invention

The present invention relates to a structure of a soundproof cover for an engine room which is mounted in an engine room so as to prevent noise occurring in an engine from entering the interior of a vehicle, and more particularly, to a structure of a soundproof cover for an engine room which is configured to be dividable into two or more parts so as to improve performance in preventing inflow noise and in providing convenience in replacing components.

2. Description of Related Art

An engine of a passenger vehicle is mounted in an engine room that is provided at a front side of a body frame of a vehicle body, and coupled to the body frame through a vibration isolating device such as an engine mount, and a roll rod in order to prevent vibration and noise from entering the interior of the vehicle.

Figure 1A:
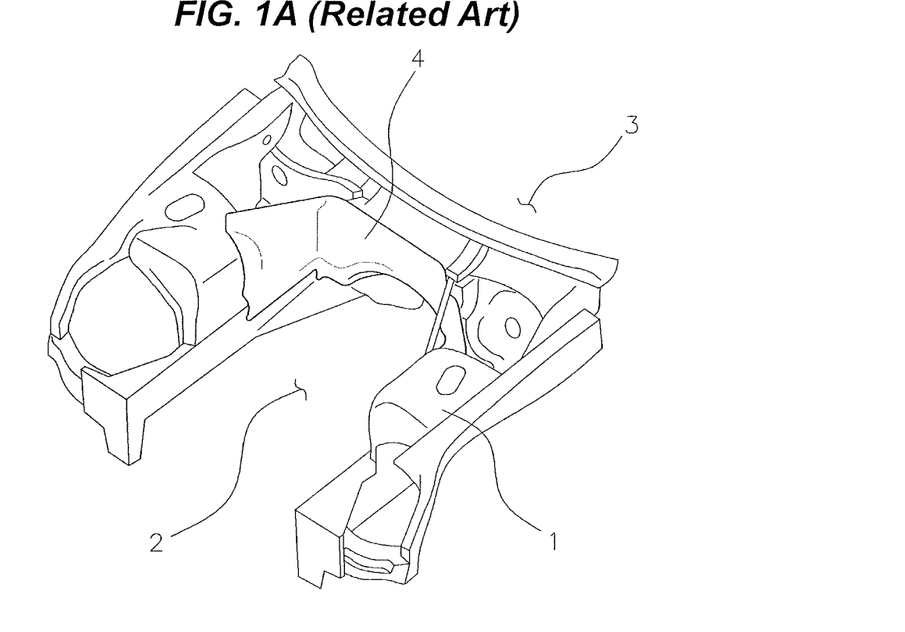
FIG. 1A is an image illustrating an appearance in which a soundproof cover in the related art is mounted on a body frame of a vehicle body at a rear side of an engine room.
Figure 1B:
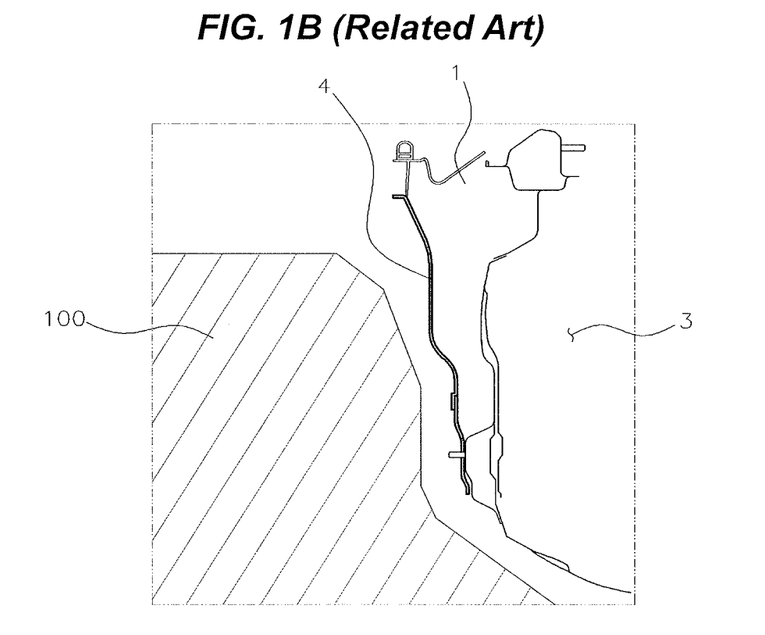
FIG. 1B is an image illustrating an appearance in which the soundproof cover in the related art which is attached to the body frame is disposed to be close to an engine.

As illustrated in FIGS. 1A and 1B, in order to additionally inhibit noise generated in an engine 100 from entering the interior of the vehicle, a soundproof cover 4 is mounted on a body frame 1 between an engine room 2 and the interior 3 of the vehicle. The general soundproof cover 4 in the related art is made of synthetic resin, manufactured in the form of an integral panel, and attached to the body frame 1.

However, the soundproof cover 4 in the related art is formed as an integral body, and thus has a limitation in optimizing NVH (noise, vibration, and harshness) performance. That is, it is necessary to mount the soundproof cover, which is partially made of different materials, in accordance with a distance and a mounting position from noise sources (an engine, a transmission, hydraulic devices, and the like), and because the entire soundproof cover needs to be detached so as to repair the vehicle, there is a problem in that A/S convenience deteriorates.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

The present invention has been made in an effort to provide a soundproof cover for an engine room which has two or more (preferably four in some cases) piece members that are detachably coupled to each other, such that soundproof performance may be improved by the piece members made of different materials, and the soundproof cover may be partially detached or mounted at the time of maintenance of a vehicle.

Various aspects of the present invention provide a structure of a soundproof cover for an engine room which is mounted at a predetermined position of a body frame, which partitions an engine room and the interior of a vehicle, at a rear side of an engine room in which an engine is mounted. The structure may include two or more piece members that are detachably coupled to each other and collectively form the soundproof cover in a panel shape, wherein the soundproof cover is to be mounted on the body frame so that one side surface of the soundproof cover is directed toward the engine and the other side surface of the soundproof cover is directed toward an interior of a vehicle.

The soundproof cover according to an aspect of the present invention may be configured by coupling four piece members so that the soundproof cover may be divided into two piece members in a longitudinal direction and a lateral direction, respectively, and thereby, the soundproof cover may be divided into four piece members.

Further, each of the piece members may have a flange portion formed along an edge thereof and the flange portion may have a groove into which an end of a neighboring piece member is to be inserted, and in a state in which the end of the neighboring piece member is inserted into the groove of the flange portion (in a state in which the piece members are temporarily assembled), a fastener may be provided to couple the piece members by penetrating the flange portion and the end of the neighboring piece member.

In addition, the soundproof cover in the engine room may be divided into at least two piece members, and in the engine room, the piece members may be coupled to each other using an adhesion unit that is detachable.

According to the present invention having the aforementioned configuration, the soundproof cover may be partially separated such that the soundproof cover may be configured by coupling soundproof members made of different types of materials, thereby improving soundproof performance, and the soundproof cover may be partially detached at the time of maintenance and repair of a vehicle, thereby improving maintainability.

In addition, the piece members each may have the flange portion which is formed along an edge thereof and has a groove such that the neighboring piece members may be fixed while being temporarily assembled with each other, thereby easily installing and replacing the piece members.

In addition, according to the soundproof cover for an engine room of the present invention, the piece members for the engine room are attached to each other using the adhesion unit, such that upper partition walls in the engine room may be easily detached without separating the engine from the engine room, therefore improving convenience of maintenance, and reducing costs required for separating the engine.

The methods and apparatuses of the present invention have other features and advantages which will be apparent from or are set forth in more detail in the accompanying drawings, which are incorporated herein, and the following Detailed Description, which together serve to explain certain principles of the present invention.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figures 2A, 2B:
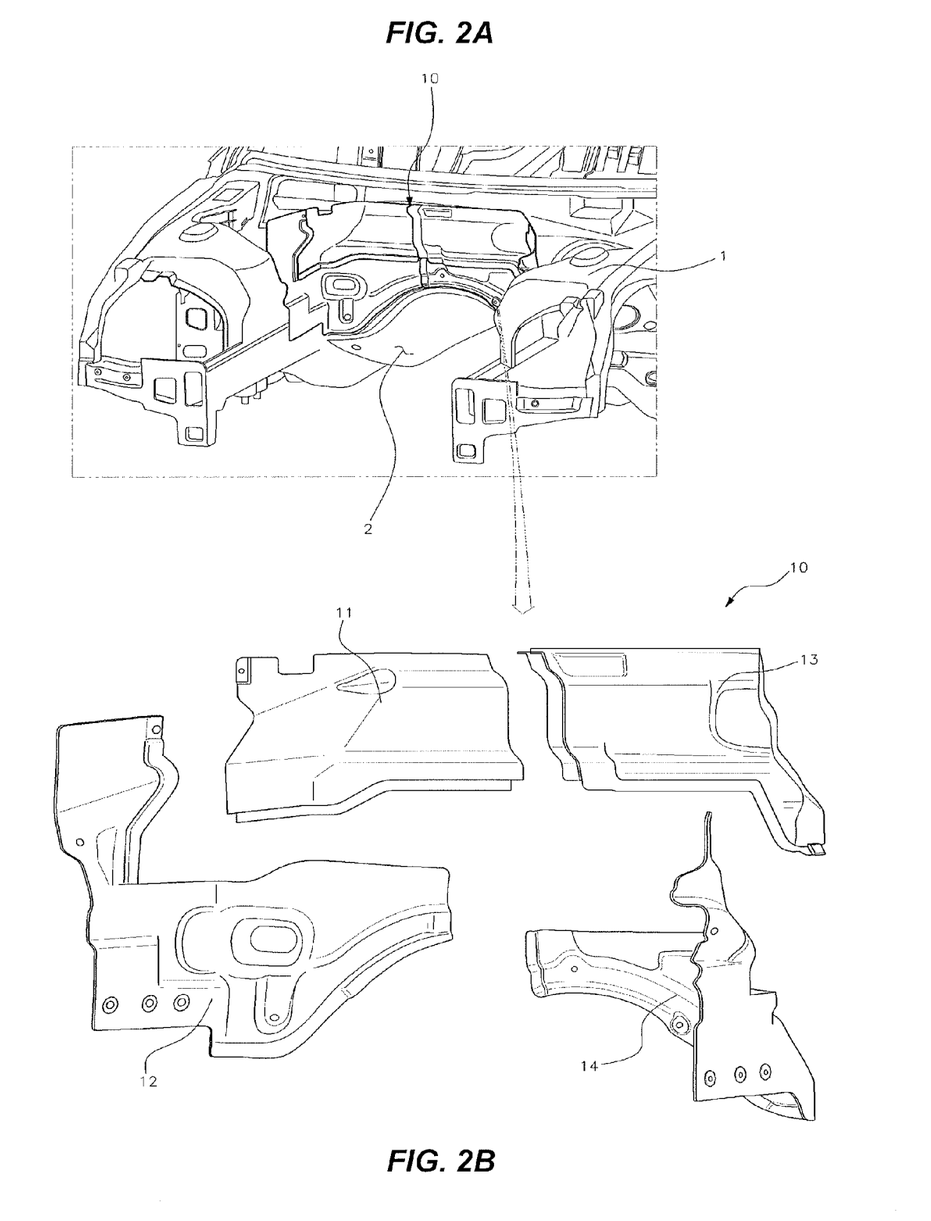
FIG. 2A is an image illustrating an appearance in which an exemplary soundproof cover according to the present invention is mounted on a body frame.
FIG. 2B is an exploded perspective view of the soundproof cover of FIG. 2A.

Referring to FIG. 2, a soundproof cover 10 of the present invention is mounted on a body frame 1 at a rear side of an engine room 2 in which an engine is mounted, so as to prevent noise from penetrating between the interior of a vehicle and the engine room 2.

The soundproof cover 10 according to various embodiments of the present invention has a predetermined area, and is formed in the form of a panel (plate) which has a bent shape in accordance with a position where the soundproof cover 10 is attached. Further, the soundproof cover 10 is mounted on the body frame 1 so that one side surface of the soundproof cover 10 is directed toward the engine, and the other side surface of the soundproof cover 10 is directed toward the interior of the vehicle, and the soundproof cover 10 has a plurality of piece members such as four piece members, that is, a first piece member 11, a second piece member 12, a third piece member 13, and a fourth piece member 14, which are detachably or separably coupled to each other.

The soundproof cover 10 may be configured to be divided into various shapes and sizes in accordance with a shape of the body frame 1 and arrangement of mounted components. As an example, the soundproof cover 10 according to various embodiments of the present invention is configured to be divided into two piece members in a lateral direction and a longitudinal direction, respectively, such that the soundproof cover 10 is divided into four piece members.

Figure 3:
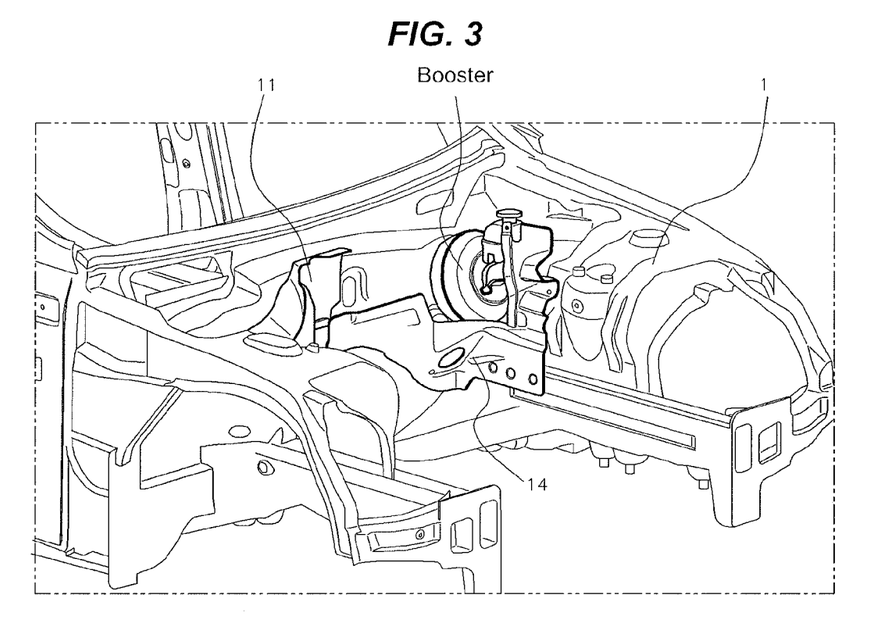
FIG. 3 is a view illustrating an appearance in which an exemplary third piece member of the present invention is detached for maintenance of a brake booster.

According to the soundproof cover 10 of the present invention which may be divided into four piece members as described above, for example, in a case in which it is necessary to repair and replace a brake booster, only the third piece member 13, which is adjacent to the first piece member 11 and the fourth piece member 14, may be detached instead of unnecessarily detaching the entire soundproof cover 10, and only the third piece member 13 may be coupled again.

Meanwhile, in various embodiments of the present invention, in order to improve assembly convenience, the respective piece members may be mounted on the body frame 1 in a state in which two piece members are temporarily assembled, respectively, or three piece members are temporarily assembled.

Figure 4A:
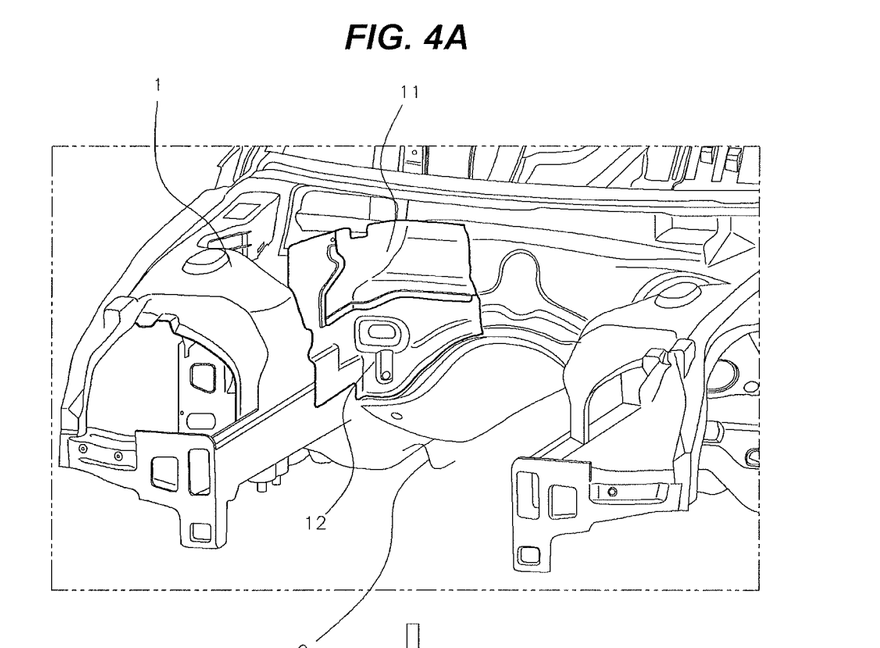
FIG. 4A and FIG. 4B are views illustrating an appearance in which exemplary soundproof covers of the present invention are mounted on the body frame in a state in which two soundproof covers are temporarily assembled together, respectively.
Figure 4B:
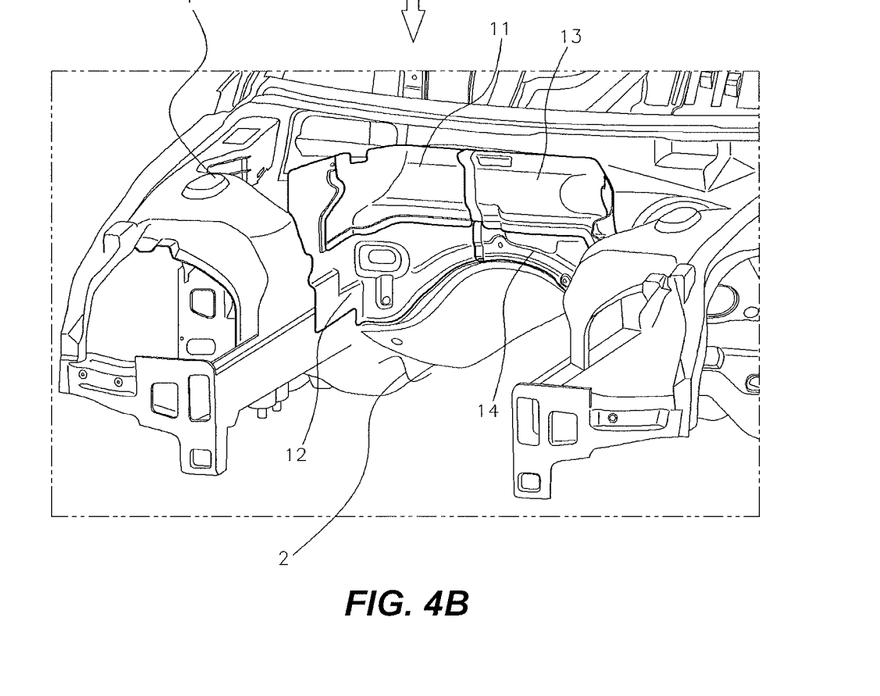

That is, as illustrated in FIG. 4, the first piece member 11 and the second piece member 12 may be temporarily assembled as a single assembly, and then first mounted on the body frame 1, and thereafter, an assembly of the third piece member 13 and the fourth piece member 14 may be mounted on the body frame 1.

Figure 5A:
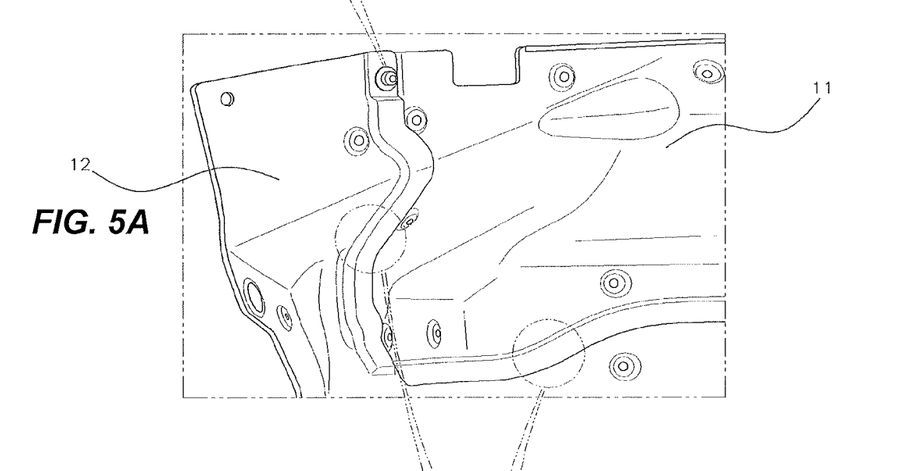
FIG. 5A is a view illustrating a state in which an exemplary first piece member and an exemplary second piece member are temporarily assembled.
Figure 5B:
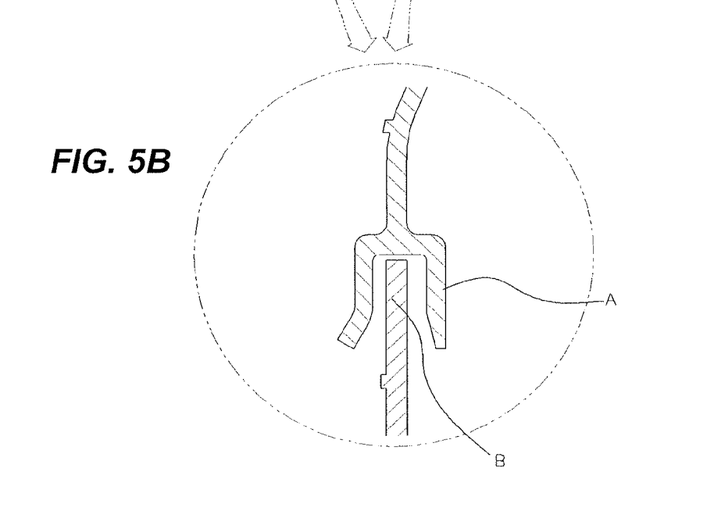
FIG. 5B is a cross-sectional view of a portion of the assembled first and second piece members of FIG. 5A.
Figure 5C:
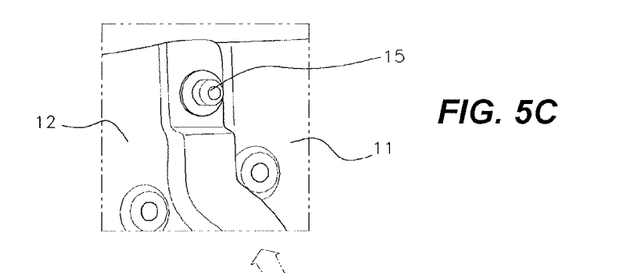
FIG. 5C is an enlarged appearance of a fastener shown in FIG. 5A.

Moreover, the piece members of the present invention each has a flange portion A which is formed along an edge thereof which is to be adjacent to a neighboring piece member, and has a groove into which an end of the neighboring piece member may be inserted. In more detail, referring to FIG. 5, the piece members are temporarily assembled in a state in which an end B of the neighboring piece member is inserted into the groove of the flange portion A, and when the piece members are mounted on the body frame 1 after the piece members are temporarily assembled, a fastener 15 couples the piece members while penetrating the flange portion A and the end B of the neighboring piece member.

Furthermore, the piece members of the present invention may have at least one adhesion unit 100 which detachably couples the piece members at a joint interface between any one of the piece members and another piece member, and a detail configuration of the adhesion unit 100 will be described below.

Figure 6:
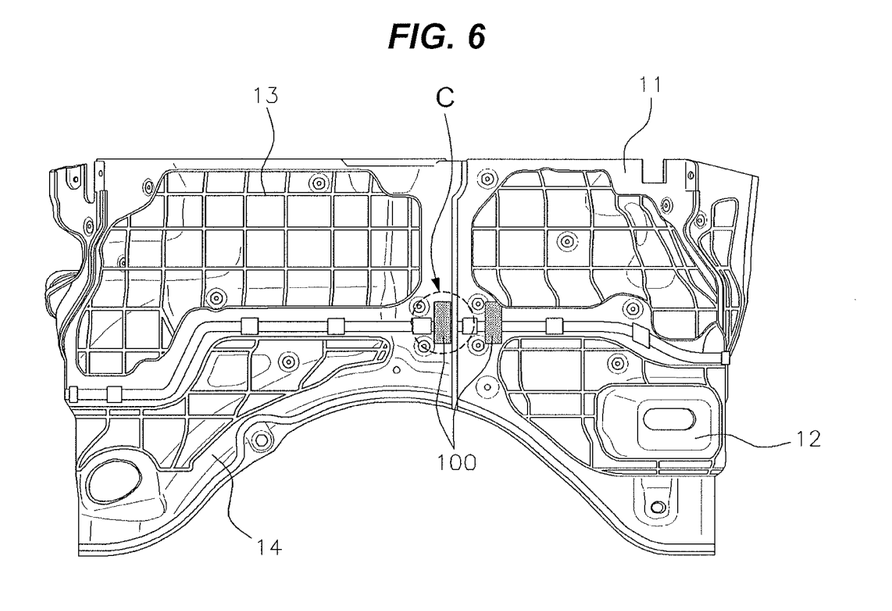
FIG. 6 is a configuration view illustrating a state in which exemplary piece members of the present invention are coupled to each other using an exemplary adhesion unit.
Figure 7:
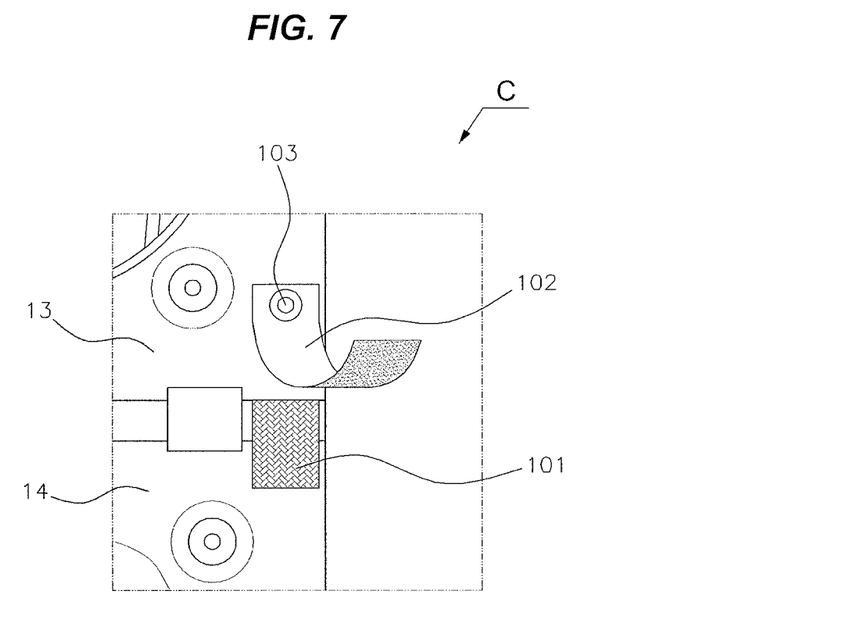
FIG. 7 is an enlarged view of part C of FIG. 6.

FIG. 6 is a configuration view illustrating a state in which the piece members of the present invention are coupled to each other using an adhesion unit, and FIG. 7 is an enlarged view of part C of FIG. 6. As illustrated in FIG. 6, as coupling means for coupling the first piece member 11 and the second piece member 12 of the soundproof cover 10 of the present invention, and as coupling means for coupling the third piece member 13 and the fourth piece member 14 thereof, the adhesion unit 100 is adopted instead of the fastener 15.

That is, as illustrated in the enlarged view of part C of FIG. 7, at least one adhesion unit 100 is attached to the joint interface between the first piece member 11 and the second piece member 12, and the adhesion unit 100 includes a to-be-adhered plate 101 as a lower end of the adhesion unit 100, and an adhesive plate 102 as an upper end of the adhesion unit 100, and both plates 101 are 102 are detachable from each other.

Likewise, the adhesion unit 100 is also attached to the joint interface between the third piece member 13 and the fourth piece member 14.

As the to-be-adhered plate 101 and the adhesive plate 102 of the adhesion unit 100, Velcro members (also called "magic tape" or "loop-and-hook fastener") may be used. In addition, the adhesion unit 100 may be attached using a fixing member 103 such as a screw.

According to the soundproof cover 10 of the present invention which is configured as described above, the adhesive plate 102 is attached to the to-be-adhered plate 101 of the adhesion unit 100 so as to couple both partition walls in a state in which joint surfaces of the first piece member 11 and the second piece member 12 face each other, the adhesive plate 102 is attached to the to-be-adhered plate 101 of the adhesion unit 100 so as to couple both partition walls in a state in which joint surfaces of the third piece member 13 and the fourth piece member 14 face each other, and then a side surface of the coupled body of the first piece member 11 and the second piece member 12 is coupled to a side surface of the coupled body of the third piece member 13 and the fourth piece member 14, such that the soundproof cover 10 is overall assembled.

Therefore, in a case in which only the first piece member 11 and the third piece member 13, which are upper parts of the partition walls, are organized for maintenance of the brake booster, pipes of an air conditioner, and wiring of electric wires, which are positioned around the engine room of the vehicle, in a state in which the soundproof cover 10 of the present invention, which is coupled as described above, is attached in a space of the engine room, when a mechanic grasps upper portions of the first piece member 11 and the third piece member 13, and then lifts up the first piece member 11 and the third piece member 13, the adhesive plate 102 of the adhesion unit 100, which is attached to each of the partition walls 11 and 13, is detached from the to-be-adhered plate 101 by upward force applied to the piece members 11 and 13, and thereby, the first piece member 11 and the third piece member 13 are easily detached.

Therefore, an operation of separating and lifting up the engine to remove a member such as the fastener 15 that fastens the first piece member 11 and the second piece member 12 is not necessary, thereby improving efficiency in maintenance of the vehicle, and reducing costs required for separating the engine.

For convenience in explanation and accurate definition in the appended claims, the terms "upper" or "lower", "front" or "rear", and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A structure of a soundproof cover for an engine room, which is to be mounted on a body frame at a rear side of the engine room in which an engine is mounted, the structure comprising:
    two or more piece members that are detachably coupled to each other and collectively form the soundproof cover in a panel shape, wherein the soundproof cover is to be mounted on the body frame so that one side surface of the soundproof cover is directed toward the engine and the other side surface of the soundproof cover is directed toward an interior of a vehicle,
    wherein each of the two or more piece members has a flange portion formed along an edge thereof and the flange portion has a groove into which an end of a neighboring piece member of the two or more piece members is to be inserted.

2. The structure of claim 1, wherein the soundproof cover is formed by coupling four piece members.

3. The structure of claim 2, wherein in a state in which the end of the neighboring piece member is inserted into the groove of the flange portion, a fastener is provided to couple the four piece members by penetrating the flange portion and the end of the neighboring piece member.

4. The structure of claim 2, wherein at least one adhesion unit, which detachably couples the four piece members, is formed at a joint interface between any one of the four piece members and the neighboring piece member.

5. The structure of claim 4, wherein the adhesion unit is formed at the joint interface between a first piece member and a second piece member among the four piece members.

6. The structure of claim 4, wherein the adhesion unit is formed at the joint interface between a third piece member and a fourth piece member among the four piece members.

7. The structure of claim 4, wherein the adhesion unit includes a to-be-adhered plate as a lower end, and an adhesive plate as an upper end.

8. The structure of claim 7, wherein the to-be-adhered plate and the adhesive plate of the adhesion unit are Velcro members.

9. The structure of claim 1, wherein the soundproof cover is formed by coupling four piece members, of which two piece members are disposed in a longitudinal direction and two piece members are disposed in a lateral direction.

* * * * *